United States Patent [19]
Haberle

[11] 3,790,327
[45] Feb. 5, 1974

[54] APPARATUS FOR PRODUCING A THERMOPLASTICALLY DEFORMABLE PLASTIC FOIL

[76] Inventor: Wilhelm Haberle, D7487 Scheer/Wurtt, Industriegelande, Germany

[22] Filed: Jan. 24, 1972

[21] Appl. No.: 220,210

[30] Foreign Application Priority Data
Feb. 1, 1971 Germany............... P 21 04 493.9

[52] U.S. Cl................ 425/376, 264/176, 425/378, 425/DIG. 30
[51] Int. Cl............................................. B29f 3/06
[58] Field of Search 425/376, 378, 79, 224, DIG. 36; 264/176 R

[56] References Cited
UNITED STATES PATENTS

| | | | |
|---|---|---|---|
| 2,696,640 | 12/1954 | Wienand | 425/376 |
| 3,578,523 | 5/1971 | Ohse | 264/176 R X |
| 2,031,387 | 2/1936 | Schwarz | 425/DIG. 30 |
| 2,279,440 | 4/1942 | Broy et at. | 425/DIG. 30 |
| 1,302,484 | 4/1919 | Stratton et al. | 425/378 X |
| 2,365,326 | 12/1944 | Bailey | 425/376 X |
| 2,994,913 | 8/1961 | Holman | 425/378 X |
| 3,416,190 | 12/1968 | Mehnert | 425/378 X |
| 3,632,702 | 1/1972 | Carrow | 425/378 X |
| 3,649,147 | 3/1972 | Fritsch | 425/376 X |

Primary Examiner—Robert L. Spicer, Jr.
Attorney, Agent, or Firm—Ernest F. Marmorek

[57] ABSTRACT

An apparatus for the production of a thermoplastically deformable plastic foil from a granulated or powdered material comprising a storage container, a block-shaped cylinder coupled to the container for receiving the material to be processed therefrom, a charging and compressing arrangement coupled between the cylinder and the storage container for conveying the material into the cylinder for compression and plastification therein, and a slot-shaped nozzle coupled to the cylinder or formed integrally therewith for passing the material therethrough and thereby forming the plastic foil. The invention discloses also a method for making the plastic foil.

11 Claims, 7 Drawing Figures

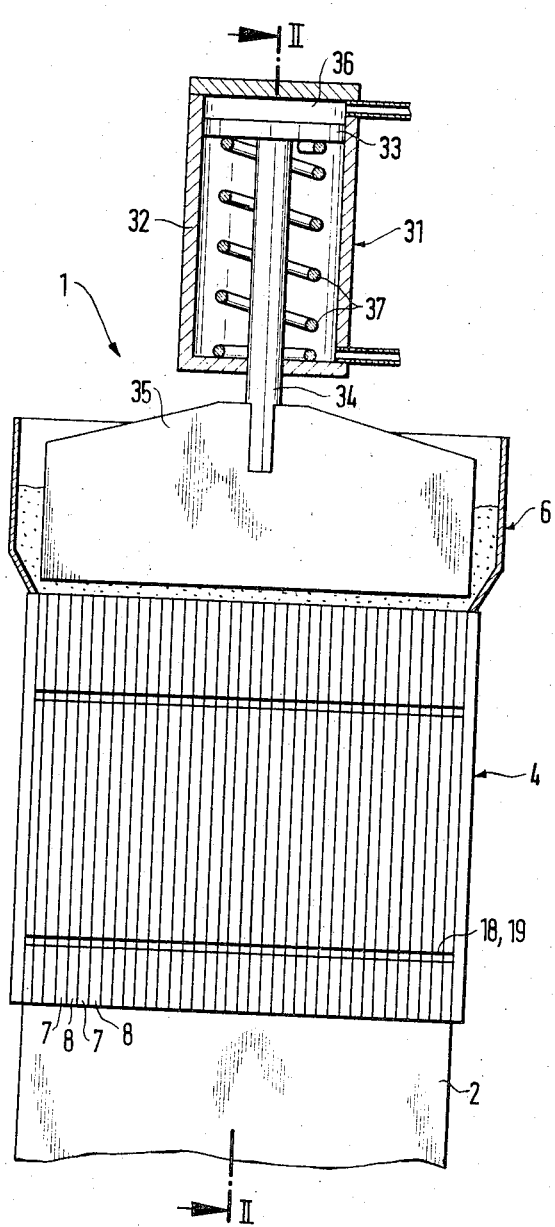
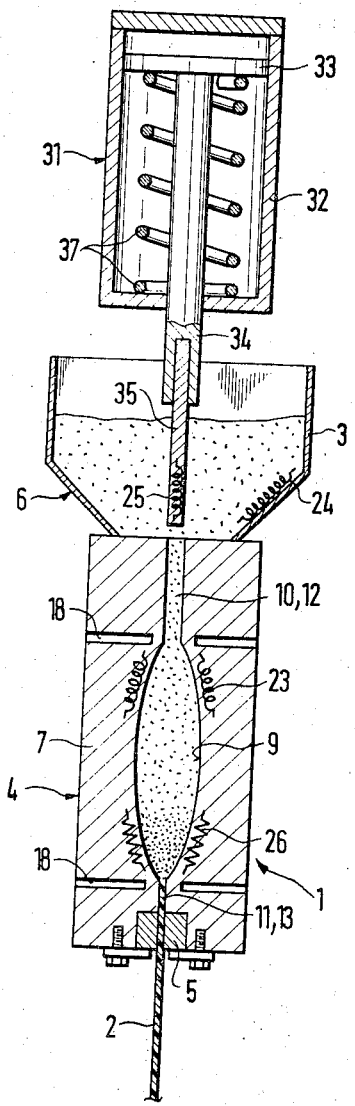
Fig. 1
Fig. 2

APPARATUS FOR PRODUCING A THERMOPLASTICALLY DEFORMABLE PLASTIC FOIL

FIELD OF THE INVENTION

The present invention relates to a method and apparatus for the production of a thermoplastically deformable plastic foil perferably from a granulated material or powder.

BACKGROUND OF THE INVENTION

For the production of thermoplastically deformable foils there are already several methods and the appropriate apparatus known. According to one of such known methods a plastic mass becomes plasticized by kneading rollers then it is rolled out on an adjoiningly place calender, while according to another known method the foil becomes forced through and appropriately constructed wide-slotted nozzle which receives the plasticized material from an extruder. Both devices are provided with a subsequently coupled removing and take-up arrangements as well as cutting and heating arrangements.

Notwithstanding the fact that the foil making according to these known methods has proved itself, these devices are very expensive and the installation and operating costs must be reflected in the product, therefore, as a result, the foils produced by such known devices are relatively expensive and many times an economical production of the foils becomes prohibitive.

It is also known to plasticize the granulated material in a round cylinder provided with heating ribs and by means of a piston to force out through a nozzle intermittently a strip which in length corresponds to the displacement of the piston. The strip which has not been formed yet is delivered immediately to the processing machine and frequently by means of additional devices a further forming takes place, such as the formation into pots.

The forces which in the known devices are necessary in order that the material could be forced through the nozzle and, which at the same time act on the walls of the cylinder, are so high that the cylinder cannot exceed a certain dimension with respect to its size and at the same time the cylinder must be constructed in such a solid and rigid manner from a high quality material that economic manufacturing of larger units becomes prohibitive. Furthermore, it is a disadvantage in connection with these known devices that the removal of the material for the further processing does not take place in the form of a foil, but it is in the form of a strip or strand so that the subsequently disposed deep drawing machine must be provided with additional devices and the capacity of such additional devices is usually limited. As a result, a production of plastic foils with the known devices is not very economical.

SUMMARY OF THE INVENTION

It is, therefore, an object of the present invention to provide a method and apparatus for the production of thermoplastically deformable plastic foils preferably from a granulated or powdered material which eliminates the above-described disadvantages of known methods and apparatus.

It is another object of the present invention to provide an improved method and apparatus for the production of the above described plastic foils which eliminate the above described disadvantages of known devices and methods and which, at the same time, are simple in their construction and create conditions for an economical production and operation in the manufacturing of plastic foils.

It is still another object of the present invention to provide an improved plastic foil making machinery and a method of making of such plastic foil in which the foil can be produced in any desirable width and thickness and wherein the apparatus can be quickly adjusted to the particular requirements and wherein the foil can be forced out from the device continuously or intermittently.

It is a further object of the present invention to provide an improved apparatus for the production of thermoplastically deformable plastic foils wherein the forces arising during the plasticizing step become substantially balanced within the cylinder block of the device.

It is still a further object of the present invention to provide a method for the production of thermoplastically deformable plastic foils from a granulated or powdered material in which the foil is produced from the granulated or powdered material by being forced through a slot-like nozzle in the plasticized form.

It is an ancillary object of the present invention to provide in the above-described improved method and apparatus for the production of thermoplastically deformable foils of the present invention that in addition to the provision of variable widths and thickness for the foil the length of the foil as being forced out through the nozzle apparatus can be varied according to the requirement of the subsequently coupled processing machine, such as a deep-drawing machine for the making of pots.

Accordingly, the present invention provides a method for the production of thermoplastically deformable plastic foils from a granulated or powdered material according to which the material which is to be processed into a foil is supplied for the plastification and compressing to a block-like cylinder member and from such cylinder member it is forced out through an adjustable slot-type nozzle corresponding in width to the desired width of the foil.

In order that such method could be applied in a most advantageous manner additional devices must be provided comprising a storage container for the material to be processed and which is coupled to a block-like cylinder to which the material is fed by means of a charging and/or compressing arrangement by means of which it becomes compressed and plasticized in the cylinder, and wherein the cylinder is provided with a slot-like nozzle corresponding to the width of the foil serving for the forcing out of the foil.

The cylinder receiving the material to be processed preferably and according to the present invention is made up from a plurality of adjacently placed lamellae or discs or similarly shaped elongated material which have a common entry opening and a common exit opening preferably lying in the same plane and wherein an adjacent pair of lamellae have provided therein each a cylindrical space and are separated by a closed or substantially closed lamella from each other. It is within the scope of the present invention to make up the cylinder block from a plurality of disc-shaped cylinder portions containing the recesses and separated by a wall and having common entry and exit openings.

Furthermore it is advantageous that the cylinder, the slot-shaped nozzle and/or the storage container and/or the charging and/or the compressing arrangement be provided with heating and/or cooling devices in order to prevent a jamming and that the edges along the passages between the adjacent cylinder spaces to be chamfered or rounded off.

It is also within the scope of the present invention to provide a slot-like nozzle for the production of the foil with an adjustable width and thickness. This can be done by the provision of an exchangeable nozzle insert in the exit opening of the cylinder or by providing recesses in the lamellae or discs forming the cylinder block and by causing to tilt the lamellae portion forming the exit opening a variation of the exit nozzle will result.

As charging and/or compressing arrangement one may provide according to the present invention a plurality of pressure devices acting on a piston, a plurality of conveyor rolls and/or an extruder.

The forces acting on the outer walls of the cylinder according to the present invention become lessened by the fact that the intermediate lamellae or discs balance out a large portion of the side forces resulting from the axial push force of the piston and only the forces acting on the outer cylinder portion remain to be balanced out. The installation and the production costs of the device according to the present invention considering also that the appropriately formed lamellae or discs can be subjected to a production, is slight. As a result, a very economical production of the plasticizer is possible, the operational disturbances are practically eliminated and the operating costs can be kept to a minimum.

BRIEF DESCRIPTION OF THE DRAWINGS

The invention will become more readily apparent from the following description of preferred embodiments thereof shown in the accompanying drawings, in which:

FIG. 1 is a plan view of the foil making device according to the present invention consisting of individual lamellae or discs;

FIG. 2 is a sectional view according to FIG. 1 taken along line II—II;

DESCRIPTION OF THE PREFERRED EMBODIMENTS

Figure 3:
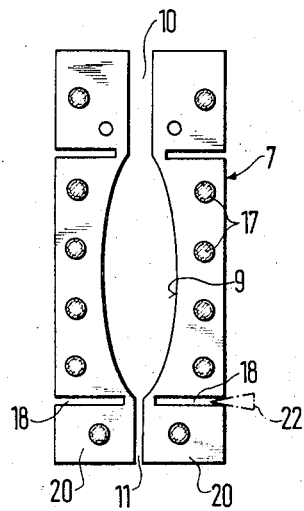
FIG. 3 is the plan view of a lamella or disc provided with a cylindrical recess as the cylindrical space.

A device identified by 1 in FIGS. 1 and 2 serves for the production of a foil 2 made from a granulated material or from a powder material 3 and comprises a cylinder block 4 having therein provided a plurality of cylindrical spaces 9 adjacent to each other formed by the adjacent mounting of appropriately shaped lamellae or discs 7 and 8 as hereinafter described, a storage container 6 for the granulated material 3 as well as a charging and/or compressing arrangement 31 through which the granulated material 3 reaches the entry opening 10, 12 of the cylinder 4 and becomes pressed out in the form of a foil 2 through the exit openings 11, 13. In addition within the exit openings 11, 13 a slot-type nozzle 5 is provided in an exchangeable fashion and by means of which the thickness and also the width of the foil 2 can be adjusted by inserting a different nozzle.

Figure 4:
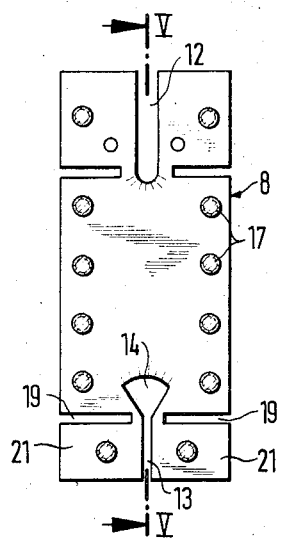
FIG. 4 is a plan view of a lamella or disc serving as a separating wall between the adjacent lamellae or discs containing the cylindrical spaces.
Figure 5:
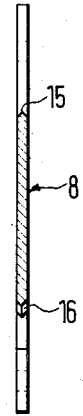
FIG. 5 is a side of the lamella or disc according to FIG. 4.

The cylinder 4 in the illustrated embodiments of the present invention comprises a plurality of lamellae or discs 7 and 8 illustrated in more detail in FIGS. 3, 4, and 5 which are held together by means of stud bolts 17. The individual lamellae or discs 7 are formed with a cylindrical recess 9 while the lamellae 8 are provided only with a smaller cutout 14 having chamfered edges 15 and 16 as shown in more detail in the cross sectional view of FIG. 5 of a single lamella or disc 8.

According to the present invention it is also possible that instead of the slot-type nozzle 5, the exit openings 11 and 13 of the lamellae 7 and 8 are used as a slot-type nozzle and are adjusted according to the particular requirement. For this reason the lamellae or discs 7 and 8 are provided with slots 18 and 18 so that the lamellae or disc portions 20 and 21 are resilient and which by means of a wedge 22 shown with the dashed line in FIG. 3 can be either increased or reduced in their widths by causing a tilting of the resilient lamellae portions 20 and 21 about the stud bolts 17.

The charging and/or compressing arrangement serving the device 1 includes a piston 33 to which a pressurized means can be applied and which is placed in a cylinder 32 and has a rod 34 protruding into the storage container 6 and has at its end thereof fixedly coupled thereto a plunger device 35 which is dimensioned to fit into the entry openings 10, 12 of the cylinder 4 as a die.

In the event in the pressure chamber 36 of the cylinder 32 there is a pressure building up, then the piston 33 will be moved downward against the force of a compression or restoring spring 37 and the granulated material 3 becomes forced by means of the plunger device 35 through the common entry openings 10, 12 into the cylindrical spaces 9. During this process and in the cylindrical spaces 9 the granulated material 3 becomes plasticized, compressed and by turning on the heating devices 23, 24 and 25 provided in the cylinder block 4, in the storage container 6, as well as in the plunger device 35, the plastification can be made more intense.

The forces developed during the compressing process are acting on the lamellae or discs 7 and 8 and become substantially cancelled out or balanced since the lamellae or discs 8 are formed as separating walls and are exposed on both of their sides to pressure forces while through the stud bolts 17 they are exposed to pulling forces. The length of the stud bolt 17 associated with an individual cylinder portion or lamella 8 is very small so that in the event of large forces the possibility of creating any bending is eliminated since, as mentioned above, the lamella or disc 8 serves to balance the pulling forces and the pressure forces.

As a result, the charging and/or compressing arrangement 31 can be loaded with a high pressure and the plastification and compressing of the granulated material 3 in the cylindrical spaces 9 can take place at such pressures. The foil material 2 before entering the exit apertures 11, 13 becomes cooled by means of a cooling arrangement appropriately built into the cylinder block 4 and then becomes pressed through the slot-type nozzle 5 as a foil 2.

Figure 6:
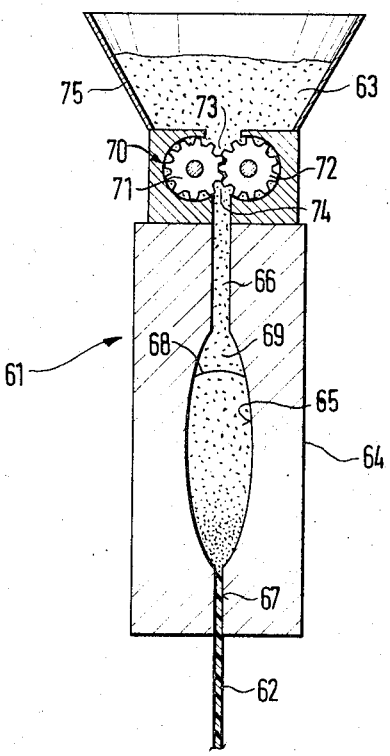
FIG. 6 is a sectional view of another embodiment of the device according to the present invention.

With reference to FIG. 6 it is seen that the device 61 illustrated therein serves for the production of a foil 62 from a granulated material 63 which is contained in a storage container 75 and which is to enter the cylindrical block 64 containing the individual cylindrical spaces 65 as discussed above and which are separated by the intermediate walls 68. The individual cylindrical spaces 65 are connected with each other by means of common entry aperture 56 and by means of a common exit aperture 67 formed as a slot-type nozzle and by means of the cutout portions 69 provided in the intermediate walls 68. The charging arrangement 70 here comprises a pair of rolls 71 and 72 which are in the form of a geared pump the entry opening 73 of which is coupled to the storage container 75 while the exit opening 74 of which is coupled to the entry opening 56 of the cylinder block 64.

The granulated material 63 in this embodiment is supplied by the charging or compressing arrangement 70 in a continuous fashion to the cylindrical spaces 65 and becomes there plasticized and compressed. The balancing of the forces acting on the side walls of the cylindrical spaces 65 in this embodiment is solved in a similar manner as in connection with the embodiment illustrated in FIGS. 1 and 2. After the compression in the lower portion of the cylindrical spaces 65 the foil 2 becomes pressed out through the exit aperture 67.

Figure 7:
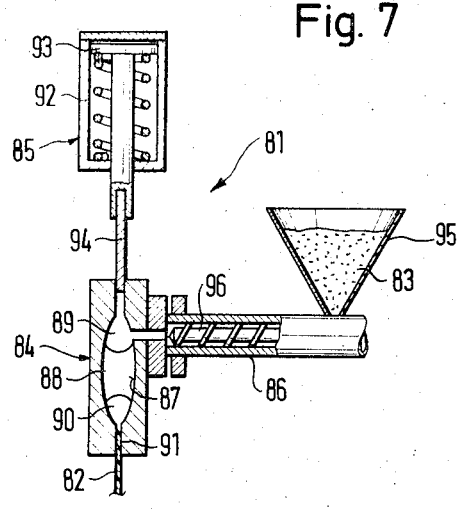
FIG. 7 illustrates in a side view and schematically and partially in section, a still further embodiment of the device according to the present invention.

The device 81 illustrated in FIG. 7 serves for the intermittent production of a foil 82 from a granulated material 83 and comprises from a cylinder block 84 a compressing arrangement 85 coupled thereto and an extruder 86 serving as the charging arrangement. The granulated material 83 in this embodiment is supplied from a storage container 95 by means of a worm-type conveyor 96 to the cylindrical spaces 87 provided in the cylinder block 84 and becomes compressed by means of a plunger device 94 coupled to a piston 93 operated by a pressure cylinder 92.

The adjacent cylindrical spaces 87 are separated by intermediate discs 88 from each other and the latter being provided with recessed portions 89 and 90 so that there will be a uniform distribution of the granulated material 3 in all the cylindrical spaces 87 and a uniform flow, plastification and compression of the granulated material can take place. The plunger device 94 can also serve to force out the foil 82 made from the granulated material 83 through the exit openings 91 serving as a slot-type nozzle.

I wish it to be understood that I do not desire to be limited to the exact details of construction shown and described, for obvious modifications will occur to a person skilled in the art.

Having thus descirbed the invention, what I claim as new and desire to be secured by Letters Patent, is as follows:

1. An apparatus for the production of a thermoplastically deformable plastic foil from a granulated or powdered material comprising a storage container, a block-type cylinder coupled to said container for receiving the material to be processed therefrom, a charging and compressing arrangement coupled between said cylinder and said storage container for conveying said material into said cylinder for compression and plastification therein, and a slot-shaped nozzle device coupled to said cylinder for passing said material therethrough and thereby forming said plastic foil, wherein said cylinder comprises a plurality of disc-shaped members, predetermined ones of said members having a recess formed therein, other ones of said members having a closed or substantially closed construction profile, adjacent ones of said one member having recesses formed therein being separated from each other by one of said closed or substantially closed profiled members, said ones and said other ones of said members having a common entry opening for said material supplied from said charging device and a common exit opening coupled to said nozzle device and means are provided to secure said disc-shaped members together to form said cylinder.

2. The apparatus as claimed in claim 1, wherein said cylinder, said storage container, said charging and compressing means and said nozzle device are provided with a heating arrangement.

3. The apparatus as claimed in claim 1, wherein said cylinder, said storage container, said charging and compressing means and said nozzle device are provided with a cooling arrangement.

4. The apparatus as claimed in claim 1, wherein said other members comprise recesses therein communicating with said one cylinder member, said recesses having edge portions which are chamfered or rounded for improving the transition of said material between adjacent cylindrical spaces.

5. The apparatus as claimed in claim 1, wherein said nozzle device is adjustable in width and thickness.

6. The apparatus as claimed in claim 1, wherein said exit opening said said disc-shaped members forms said nozzle device.

7. The apparatus as claimed in claim 1, wherein said nozzle device comprises an exchangeable insert means having a predetermined width and thickness of said slot.

8. The apparatus as claimed in claim 1, wherein said one and said other member comprise said exit openings, means to provide a slot in said one and said other disc-shaped members for receiving a tool therein the adjusting the width of said exit opening, thereby varying said exit opening serving as an adjustable nozzle device.

9. The apparatus as claimed in claim 1, wherein said charging and compressing means comprises a piston means.

10. The apparatus as claimed in claim 1, wherein said charging and compressing means comprises a pair of delivery roller means.

11. The apparatus as claimed in claim 1, wherein said charging means comprises an extruder.

* * * * *